April 24, 1956  C. W. McPHERSON  2,742,886
FUEL GENERATOR FOR INTERNAL COMBUSTON ENGINES
Filed Nov. 1, 1954
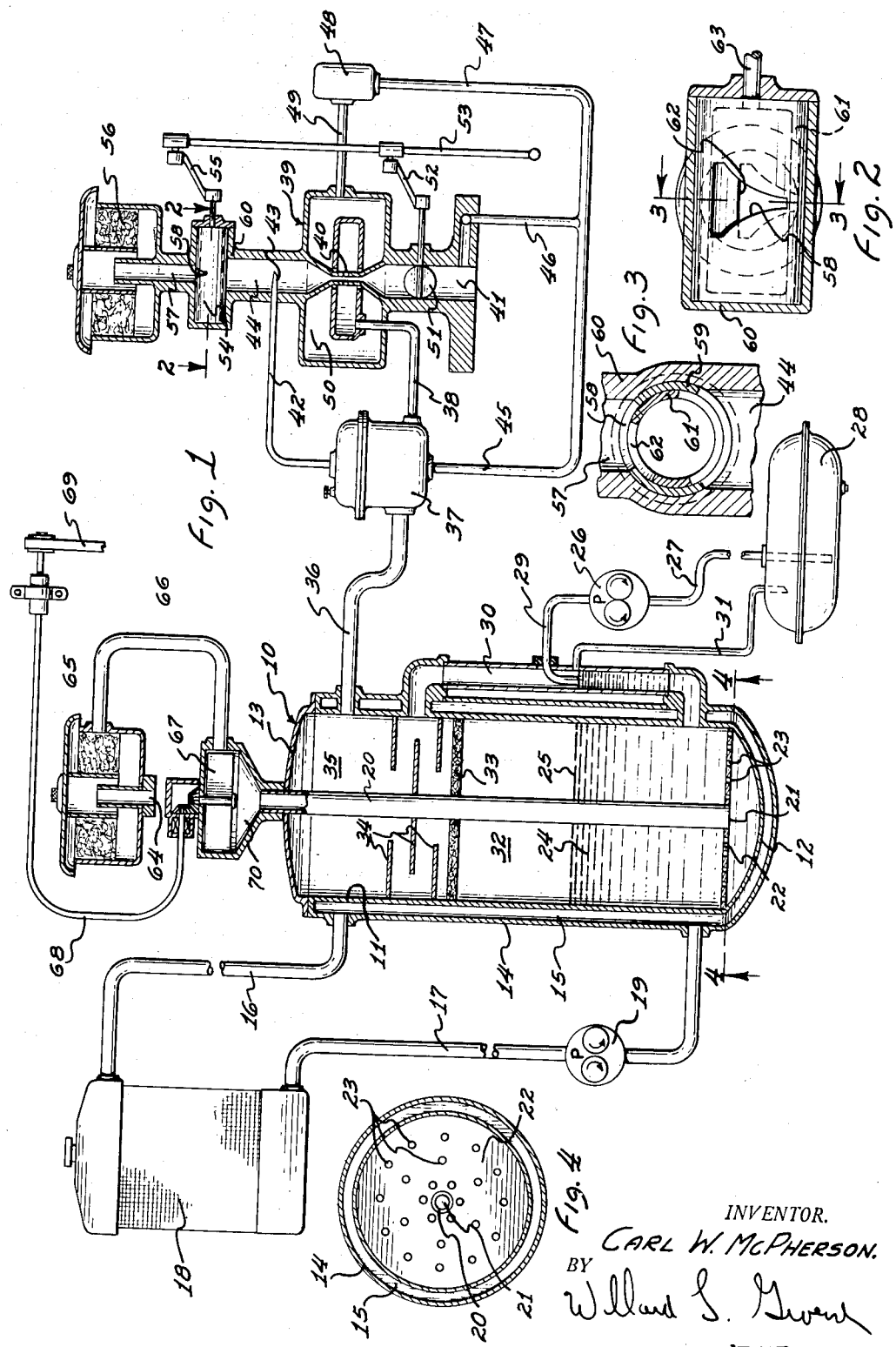
INVENTOR.
CARL W. McPHERSON.
BY
Willard S. Given
ATTORNEY.

— # United States Patent Office 2,742,886
Patented Apr. 24, 1956

2,742,886

FUEL GENERATOR FOR INTERNAL COMBUSTION ENGINES

Carl W. McPherson, Phoenix, Ariz., assignor of forty-nine per cent to Solomon P. Scholl Application November 1, 1954, Serial No. 466,085

4 Claims. (Cl. 123—133)

This invention pertains to improvements in fuel generators for internal combustion engines and is particularly adapted to the preparation of dry gas fuel for an internal combustion engine directly from liquid gasoline or the like.

One of the objects of this invention is to provide means for converting liquid fuels to a combination of gas and air mixture for presentation to an internal combustion engine.

Still another object of this invention is to provide an improved fuel generator capable of converting liquid fuels to gaseous mixtures with air for presentation to internal combustion engines to improve the efficiency, operation, and cut down maintenance cost in the operation of such engines.

Still another object of this invention is to provide an improved fuel generator for an internal combustion engine including a generating tank for converting liquid gasoline or the like to a dry gas mixture of air and gas and to present such dry gas mixture through a gas carburetor to an internal combustion engine.

Still another object of this invention is to provide an improved fuel system for an internal combustion engine including a device for converting the liquid fuel to a gas and air mixture and to present the said mixture to the internal combustion engine while feeding additional air to the mixture as it is presented through the carburetor into the engine.

A further object of this invention is to provide an improved dry gas-air mixture generator for particular use in conjunction with internal combustion engines.

Further features and advantages of this invention will appear from a detailed description of the drawings in which:

Fig. 1 is a schematic diagram showing the fuel generator system for internal combustion engines incorporating the features of this invention.

Fig. 2 is an enlarged view on the line 2—2 of Fig. 1 showing the air inlet control for the engine carburetor.

Fig. 3 is a section on the line 3—3 of Fig. 2.

Fig. 4 is a section on the line 4—4 of Fig. 1.

As an example of one embodiment of this invention, there is shown in Fig. 1 the fuel generator indicated generally at 10 which comprises a vertically disposed innercylindrical member 11 having a closed bottom 12 and a cover 13 for the top. A suitable water jacket 14 having the chamber 15 is connected through suitable piping 16 and 17 with the engine cooling radiator 18 and together with the usual circulating water pump 19 keeps the fuel generator 10 at normal engine operative temperature under all atmospheric conditions.

Fixed in the cover 13 and extending downwardly centrally of the innercylindrical can member 11 is the air inflow pipe 20 which extends downwardly and has an opening 21 located below the baffle 22. The baffle 22 is provided with a series of small perforations 23 up through which percolates the air coming in through the pipe 20 through the gasoline or liquid fuel 24 maintained at a supply level 25.

The liquid fuel supply is kept at the desired level 25 by suitable fuel pump 26 which withdraws gasoline through the line 27 from the gasoline tank 28 and discharges it through the line 29 into a sight gage 30 for indication of the correct level of the liquid fuel supply at the line 25. Suitable means may be used for controlling the fuel pump 26 to maintain this level such as a return drain line 31 or a float level control for the fuel pump 26 (not shown). Thus at all times the proper level of liquid fuel under all operating conditions is maintained at the level 25 in the fuel generator 10.

As the air coming up through the perforations 23 in the baffle 22 percolates up through the liquid fuel 24 it escapes finally at the top surface 25 of the liquid into the chamber portion 32 of the generator in the form of a gaseous mixture of air and fuel. A suitable gauze baffle 33 and labyrinth baffle 34 remove any droplets of liquid fuel in the gaseous mixture as it continues to rise into the final dry gas chamber 35 of the fuel generator.

The dry gas then discharges from the chamber 35 through a line 36 through the dry gas inlet regulator 37 and then out through the line 38 to the gas carburetor 39 of the internal combustion engine, the dry gas from the line 38 passing through the usual venturi inlet opening 40 to the passageway 41 connected to the intake manifold of the internal combustion engine. A suitable line 42 connected to the dry gas regulator 37 and terminating in the Pitot tube 43 in the intake passageway 44 of the dry gas carburetor 39 provides means for controlling the diaphragm of the dry gas inlet regulator 37. The diaphragm in the dry gas inlet regulator 37 is also controlled through vacuum applied through the line 45 connected through line 46 to the passageway 41 of the carburetor which allows dry gas to enter directly through the line 47 and the by-pass valve 48 and line 49 into the chamber 50 for applying gas directly into the engine for rapid pickup and acceleration in a well known conventional manner forming no specific part of this invention.

The butterfly valve 51 for speed control of the internal combustion engine is actuated by suitable linkage 52 from the throttle control rod 53 to which is also connected the air inlet control valve indicated at 54 through suitable linkage 55 connected to the throttle control rod 53. This valve 54 receives an intake atmospheric air supply through a suitable air cleaner 56 which is connected through the passageway 57 to the proportional air control slot 58 which varies the air input supply in proper proportion to the normal speed of the internal combustion engine. The outside cylinder member 59 containing the slot 58 is fixed in the housing 60 having the passageways 44 and 57. Inside of the outside cylindrical member is the inside member 61 having a cooperating mating proportioning slot 62. Both of the inside and outside cylindrical members are in communication with the inlet passageway 44 of the gas carburetor 39. The inside cylindrical member 61 is rotated through a shaft 63 connected to the linkage 55 of the throttle control rod 53 for rotation in proportion to throttle opening of the butterfly valve 51. Thus, by this arrangement the butterfly valve 51 and air intake to the gas carburetor are simultaneously controlled from the throttle control rod 53 in response to the speed selected from the internal combustion engine.

The other air supply into the system coming in through the air inflow pipe 20 of the fuel generator comes in through the inlet 64 of a suitable air cleaner 65 and then through a suction line 66 connected to the blower or air compressor 67 which is driven by a suitable drive shaft 68 from the fan belt 69 or other suitable drive connection with the internal combustion engine. The discharge from the blower or air compressor passes out through the discharge chamber 70 and then down through the air inflow pipe 29 to percolate up through the liquid fuel 24 as described. Thus, two supplies of air are provided for the internal combustion engine in this system, the one being mixed with the gas in the gas generator 10 and transmitted to the engine through a suitable gas regulator and gas carburetor and then the air intake supply by the vacuum of the engine coming from the air cleaner 56 to the carburetor to mix with the gas combination created in the gas generator.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A fuel generator for an internal combustion engine comprising, a fuel generator tank containing liquid fuel in the bottom thereof, blower means connected to force air through said liquid in said fuel generator tank to a dry gas carburetor for the engine, means for driving said blower from the internal combustion engine, and a throttle control rod for controlling the air intake to the carburetor for the desired speed of the engine.

2. A fuel generator system for an internal combustion engine having, a dry gas carburetor for the engine with an air inlet control valve and, a butterfly speed control valve for the outlet to the engine of said carburetor, a fuel generator connected to supply dry gas-air mixture to said carburetor characterized by means driven by said engine for supplying compressed air to said fuel generator, and a throttle control for said dry gas carburetor operable to control the speed of said engine and said driven means for said fuel generator.

3. A fuel generator system for an internal combustion engine having, a dry gas carburetor with an air inlet control valve and a butterfly speed control valve for the outlet to the engine of said carburetor, a fuel generator connected to supply dry gas-air mixture to said carburetor characterized by means driven by said engine for supplying compressed air to said fuel generator, a tank, means for maintaining liquid fuel in said tank at a predetermined level, a vertically disposed air inflow pipe extending from the top to the bottom of said tank, means for connecting said compressed air to the top of said pipe, a baffle immediately above the bottom of said tank surrounding the lower open discharge end of said air inflow pipe, a series of perforations in said baffle to allow air to bubble up through said liquid fuel to form a gas-air mixture in said tank above said liquid fuel, and means to connect the gas-air mixture at the top of said tank to the gas carburetor, and means to maintain the fuel at a predetermined temeprature.

4. A fuel generator for an internal combustion engine comprising a blower driven from said internal combustion engine for supplying compresed air to said fuel generator, a tank, means for maintaining liquid fuel in said tank at a predetermined level, a vertically disposed air inflow pipe extending from top to the bottom of said tank, means for connecting said compressed air to the top of said pipe, a baffle immediately above the bottom of said tank surrounding the lower open discharge end of said air inflow pipe, a series of perforations in said baffle to allow air to bubble up through said liquid fuel to form a gas-air mixture in said tank above said liquid fuel, means to connect the gas-air mixture at the top of said tank to said internal combustion engine, and means to maintain the fuel in said tank at a predetermined temperature from heat generated by said internal combustion engine.

References Cited in the file of this patent
UNITED STATES PATENTS

| | | |
|---|---|---|
| 1,191,097 | Speirs | July 11, 1916 |
| 2,384,609 | DeVries | Sept. 11, 1945 |

FOREIGN PATENTS

| | | |
|---|---|---|
| 94,319 | Austria | Sept. 25, 1923 |